Feb. 5, 1935.   F. J. PFEIFLE   1,990,091

MOLDING APPARATUS

Filed March 13, 1933

Inventor
F. J. Pfeifle,
By Robert M. Pierson,
Attorney

Patented Feb. 5, 1935

1,990,091

UNITED STATES PATENT OFFICE 1,990,091

MOLDING APPARATUS

Fred J. Pfeifle, Akron, Ohio, assignor to The Mechanical Mold & Machine Company, Akron, Ohio, a corporation of Ohio Application March 13, 1933, Serial No. 660,468

9 Claims. (Cl. 18—19)

This invention relates to molding apparatus, including combined molds and presses, for forming hollow articles of rubber and other plastics.

The object of my invention is to facilitate the charging of the mold cavities and stripping of the molded articles from their cores. With a multiple-cavity mold, the manipulation of the cores, especially when a large number is employed, presents a problem which heretofore has been inadequately solved. If the cores are connected in a group and handled as a loose plate, the operations of stripping individual articles from their cores and handling the plate are performed with difficulty, whereas if the cores are associated with one of the mold members and mechanically moved into and out of their cavities, the number of cavities employed in prior practice has been restricted.

My present invention overcomes these difficulties by the provision of an improved mode of mounting and operating the cores, permitting the employment of a maximum number of cavities within a given mold area and greatly facilitating the molding and stripping operations.

Figure 1:
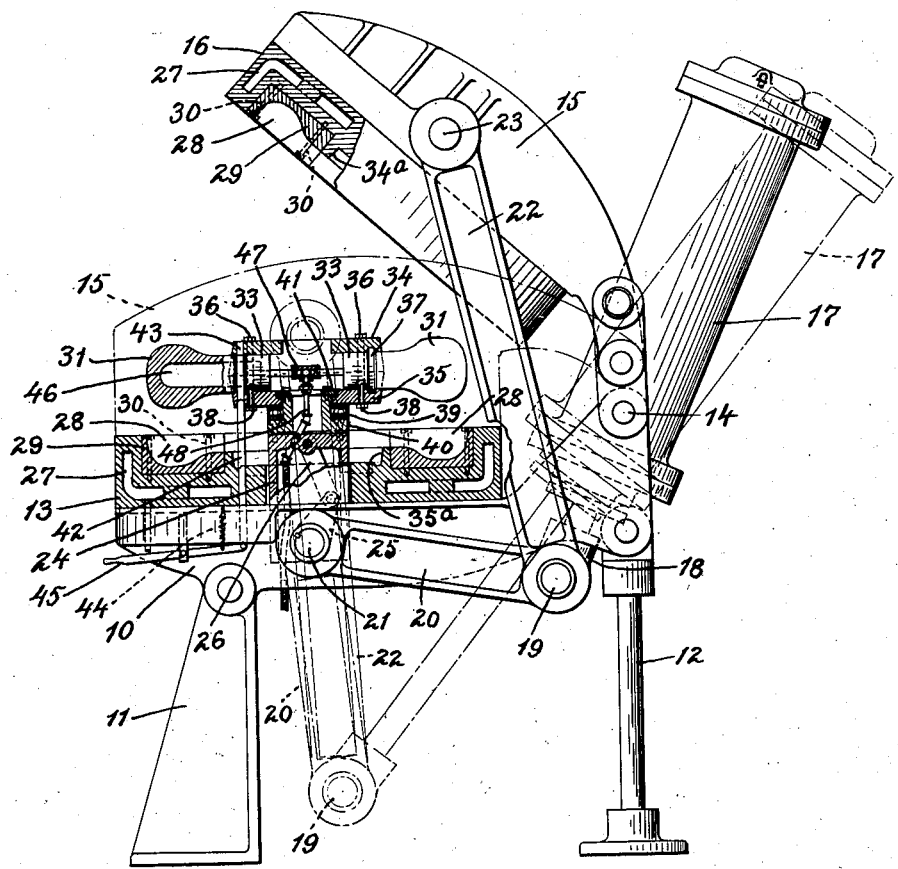
Figure 2:
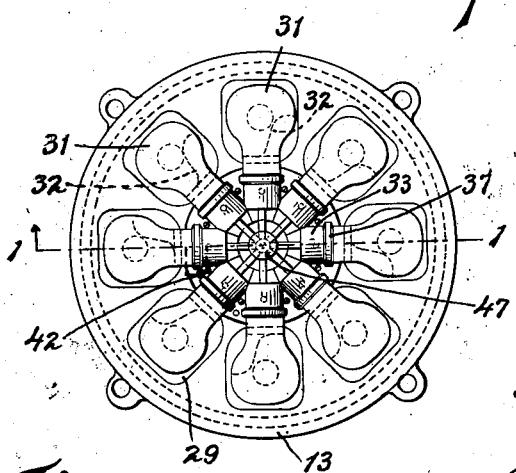

Of the accompanying drawing, Fig. 1 is a side elevation, partly in section on the line 1—1 of Fig. 2, showing a vulcanizing press combined with improved molding devices in accordance with my invention.

Fig. 2 is a plan view of the lower mold member and core assembly.

The drawing shows a toggle vulcanizing press of a type heretofore employed for the curing of pneumatic tire casings and tubes, and my invention is shown embodied in such manner that a multiple-cavity mold for curing a number of small articles can be used on the same press in place of the tire mold, and a core assembly can be used in place of the parts which support a tire and its inflatable core by their inner periphery, and operated by the knockout or ejecting devices on the press.

10 is a horizontal base or press head supported on forward and rear standards 11, 12 and fixedly supporting the horizontal lower platen 13 which constitutes or includes the lower mold member. Pivoted to the base 10 on a horizontal axis at 14 is an upper frame or press head 15 detachably carrying a platen 16 which constitutes or includes the upper mold member.

Also pivoted to the base 10 on an axis at 14 is a double-acting, fluid-pressure ram cylinder 17 containing a piston or plunger whose rod projects through a stuffing box in the lower head of the cylinder and is provided with a rod-head 18 connected with a horizontal pivot spindle or shaft 19, the latter being guided in an arcuate path by a pair of short toggle links 20 whose upper ends are pivoted on the base head 10 by a rock-shaft 21. The outer ends of the spindle 19 are connected by a pair of longer toggle links 22 with pivots 23 on the upper press head 15, so that as the spindle 19 is raised and lowered in an arcuate path by the action of the ram, the head 15 will be swung to open and close the press in an evident manner. The full lines in Fig. 1 represent the open position and the broken lines the closed position.

24 is a knockout or ejecting plunger such as heretofore employed in tire presses of the described type, centrally guided on the lower head 10 for vertical movement and operated by the press through a short toggle arm 25 fixed on the pivot shaft 21 and a pair of toggle links 26 having their lower ends pivoted to the arm 25 and their upper ends pivoted to the head of the hollow plunger 24. On said plunger 24 may be mounted either the core assembly employed in my present invention or the central rim parts commonly used for raising and lowering a pneumatic tire casing and its expansible core.

The lower and upper platens 13 and 16, which are circular in shape and may be substituted for members of a tire mold, are cast with steam-jackets 27 for heating the molds. Each of said platens is formed with a number of molding cavities 28 of shape appropriate to the articles to be formed and radially arranged in a circle about the center. A large variety of hollow rubber articles including bathing caps, gloves, etc. may be formed in molds thus arranged and their interiors shaped by corresponding cores or mandrels. It is preferred to form the cavities 28 in removable liners 29 secured by screws 30 or other fastenings so that the molds may be interchanged on the same platens for molding different sizes and shapes of the same article or articles of different kinds. These cavities are open at their inner peripheries for receiving the core stems, and it will be evident that the radial arrangement permits the grouping of a relatively large number of individual molds in platens of a given diameter and area.

31 are the individual molding cores on which the articles are formed, radially disposed in a group or assembly which is mounted upon the plunger 24. The cores and mold cavities in this instance are shaped for forming rubber bathing caps whose lower outlines are indicated at 32 on the cores in Fig. 2, and if desired, the caps may be molded inside out so that no external seam will appear thereon, and ornamented with a pattern engraved on the surface of the core in accordance with a known practice. When the plunger 24 is depressed, the cores are positioned in the mold cavities, and when said plunger is raised as illustrated in Fig. 1, said cores are elevated to a stripping and mold-loading position. The core assembly could be fixed on the plunger 24, but by arranging it as a rotary turret, the cores may be successively brought to a stripping position, as hereinafter described, without requiring the operator to move around the press.

The stems 33 of the mandrels 31 are clamped between upper and lower plates 34, 35 constituting a rotary mandrel holder or turret and held together by bolts 36, said plates substantially meeting between the mandrel stems at a middle plane and each being formed with a set of half-sockets for the stems. The edges of the turret plates are tapered or coniform to engage complemental recesses 34a 35a in the platens for centralizing the latter with the turret in the molding position. The mandrel stems are formed with annular tapered bosses 37 and the turret plates with corresponding grooves to prevent endwise movement of the mandrels, and the latter are held against turning by pins or dowels 38 in the lower plate 35 engaging their stems.

The core turret 34, 35 is rotatably mounted through an interposed ball bearing 39 upon a journal member 40 which is detachably secured upon the upper end of the knockout plunger 24 and forms an upward extension of the latter, and a detachable retaining ring 41 is provided on the upper end of said member to hold the turret against endwise removal except when desired.

42 is an indexing or locking rod mounted for vertical sliding movement on the lower platen 13 and slidably occupying a socket 43 which is formed in the turret, there being either one of these sockets or as many as the number of cores according to whether it is desired to hold the core assembly in one or a number of rotary positions. Normally the upper end of the rod is in the socket when the core assembly is in its elevated position as shown in Fig. 1, but said rod may be manually withdrawn from the socket at will against the tension of a spring 44 by means of a lever 45 pivoted on the under side of the base 10 when it is desired to rotate the turret in its elevated position. After withdrawal of the rod for an indexing movement of the turret, the lever 45 may be released and the rod will snap back into the same or a different socket 43 when the latter is brought into registry with the rod.

If it is desired to heat the article from the inside as well as the outside for quicker curing, each core 31 may be formed with an internal chamber 46 connected at its inner end with suitable steam piping in the form of one of the branches of a pipe spider 47 centrally swivelled to a fixed supply pipe 48 which passes up from below through the plunger 24.

In the operation of this apparatus, the press being open and the mold cavities and cores empty as indicated in Fig. 1, sheets of raw rubber compound for forming the lower halves of the bathing caps are laid over the mold cavities 28 and similar sheets for forming the upper halves are laid on the upper sides of the cores 31, the press is then closed to depress the cores into the cavities in the lower platen and to bring the upper platen down upon the lower one, and the molding and vulcanization of the articles proceeds. Upon completion of the cure, the press is opened, the articles upon the cores thereby removed from the mold cavities and the articles successively stripped from their cores by an operator standing in a fixed position at the front or left-hand side of the press as viewed in Fig. 1, as the turret is rotated to bring the individual cores to that position.

My invention also applies to any press where it is desired to mold at the rear thereof and strip at the front, with one or more molding cavities and corresponding cores or mandrels. For example, if only the single cavity or group of cavities and corresponding cores shown at the rear or right-hand side were provided, or only one or more out of a larger number were in use, the loading and molding could be performed at the rear, the core or cores bearing the vulcanized article or articles raised as described, and said core or cores then swung around out of registry with its or their cavity or cavities to a convenient stripping position at the front.

It will be understood that various modifications in the described embodiment could be made and that this molding apparatus could be adapted to presses of other types than the one shown, without departing from the scope of my invention as defined in the claims.

I claim:

1. Molding apparatus comprising a mold having separable members and formed with radial cavities disposed about a center, cores in said cavities, a central core support, and means for moving said support to carry the cores into and out of said cavities.

2. Molding apparatus comprising a mold composed of upper and lower members and formed with cavities disposed in a circle and having inwardly-directed openings, cores disposed in said cavities and having stems occupying said openings, a central support on which said stems are mounted, and means for raising and lowering said support.

3. Molding apparatus comprising a mold having separable members and formed with radial cavities disposed about a center, a series of radial cores disposed in said cavities, a support for said cores rotatable to bring the individual cores successively to a stripping position, and means for moving said support transversely of the mold to bring the cores into and out of the cavities.

4. A molding press comprising a pair of press heads adapted to support respective mold members, means for relatively moving said heads to open and close the press, a core support having a series of cores radially projecting therefrom for occupying individual mold cavities, and means operated by the press for moving said support to bring the cores into and out of their respective cavities.

5. A molding press comprising a fixed lower head provided with individual molding cavities radially disposed in a circle, an upper press head movable by the press to open and close said cavities, a central plunger associated with the lower head and adapted to be raised by the press during the mold-opening movement of the latter, a core turret rotatably mounted on said plunger, and a series of cores radially projecting from said turret and adapted to occupy the individual mold cavities.

6. A molding press according to claim 5 provided with a retractable indexing bolt associated with the lower head and coacting with the turret for registering the cores with their cavities.

7. Molding apparatus comprising a mold having separable members and formed with individual molding cavities, a plunger movable transversely of the plane of the mold, a series of cores for the individual cavities, and a turret rotatably mounted on said plunger and including separable plates for detachably holding the cores.

8. Molding apparatus comprising a press including separable platens having mold members accessible for loading and unloading at an operator's position at the front of the press when the latter is open, said members forming a molding cavity at the rear of the press, and a core movable into and out of said cavity transversely of the molding plane and also mounted for angular movement to bring it alternatively into a rear position registering with said cavity or a stripping position at the front of the press, out of registry with said cavity.

9. Molding apparatus according to claim 8 having platens hinged together at the rear of the press adjacent to the molding cavity.

FRED J. PFEIFLE.